US00RE40465E

(19) United States
(12) Reissued Patent
Hiroshima et al.

(10) Patent Number: US RE40,465 E
(45) Date of Reissued Patent: Aug. 26, 2008

(54) DIELECTRIC FILTER, DIELECTRIC DUPLEXER, AND COMMUNICATION APPARATUS

(75) Inventors: Motoharu Hiroshima, Ishikawa-ken (JP); Katsuhito Kuroda, Matto (JP); Shohachi Nishijima, Komatsu (JP); Hideyuki Kato, Ishikawa-ken (JP); Haruo Matsumoto, Kanazawa (JP)

(73) Assignee: Murata Manufacturing Co., Ltd. (JP)

(21) Appl. No.: 10/350,657

(22) Filed: Jan. 22, 2003

Related U.S. Patent Documents

Reissue of:
(64) Patent No.: 6,420,942
Issued: Jul. 16, 2002
Appl. No.: 09/585,055
Filed: Jun. 1, 2000

(30) Foreign Application Priority Data

Jun. 2, 1999 (JP) ..... 11-154763

(51) Int. Cl.
*H01P 5/10* (2006.01)

(52) U.S. Cl. ..... 333/26; 333/134; 333/204
(58) Field of Classification Search ..... 333/26, 333/134, 204
See application file for complete search history.

(56) References Cited

U.S. PATENT DOCUMENTS 5,373,271 A * 12/1994 Hirai et al. ..... 333/205
5,525,946 A * 6/1996 Tsujiguchi et al. ..... 333/202
5,697,088 A * 12/1997 Gu ..... 455/307
6,018,277 A * 1/2000 Vaisanen ..... 333/26
2003/0102937 A1 * 6/2003 Hiroshima et al. ..... 333/134

FOREIGN PATENT DOCUMENTS

EP 000570125 A1 * 11/1993 ..... 333/26
JP 2-94901 4/1990
JP 403254204 * 11/1991 ..... 333/26
JP 5-121904 5/1993
JP 6-500442 1/1994
JP 7-254807 10/1995

OTHER PUBLICATIONS

Nishide et al., Balance–to Unbalance Transformers, 1970, Monogr. res. Inst. Appl. elec., Japan, No. 18, pp. 69–85.*

* cited by examiner

*Primary Examiner*—Stephen E. Jones
(74) *Attorney, Agent, or Firm*—Ostrolenk, Faber, Gerb & Soffen, LLP

(57) ABSTRACT

A λ/2 resonator comprises an inner conductor formed hole having an inner conductor with both open-ends, formed therein, and λ/4 resonators comprise inner conductor formed holes having inner conductors with one short-circuited ends and the other open ends, respectively. The resonators are coupled, whereby a terminal electrode connected to the vicinity of the one open end of one of the λ/4 resonators functions as an unbalanced terminal, and terminal electrodes connected to both open ends of the λ/2 resonator function as balanced terminals.

11 Claims, 10 Drawing Sheets

FIG. 2A
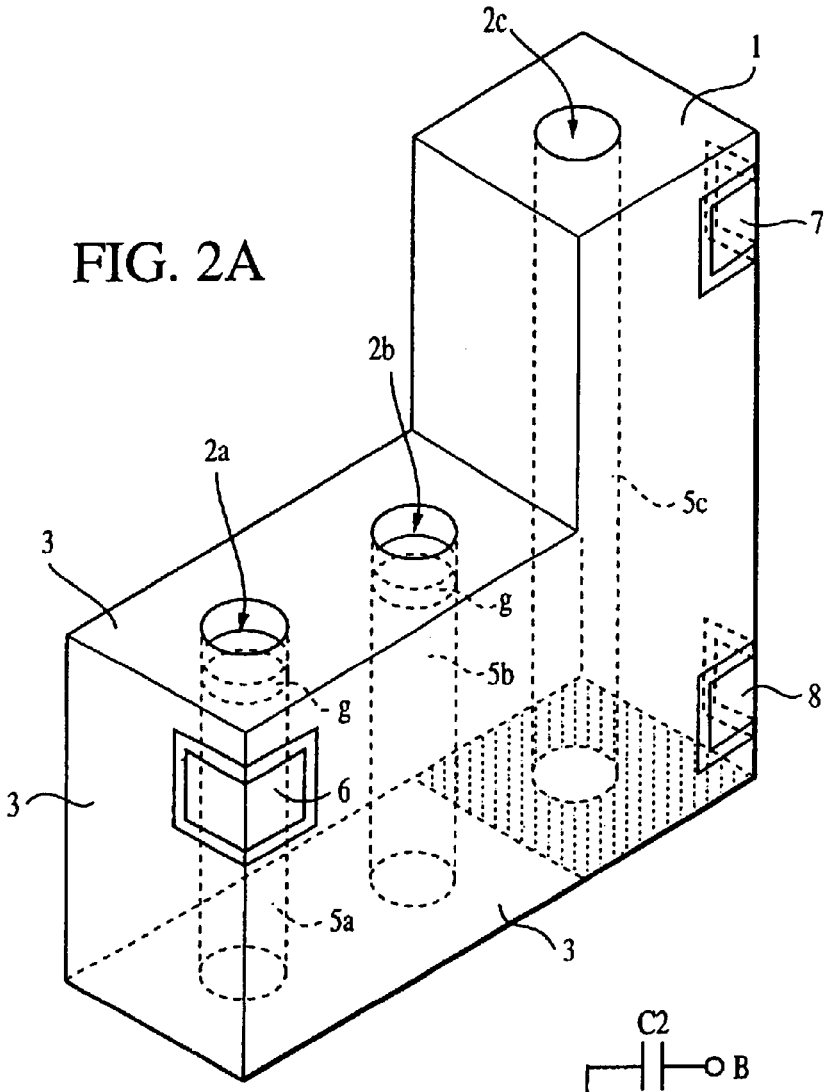
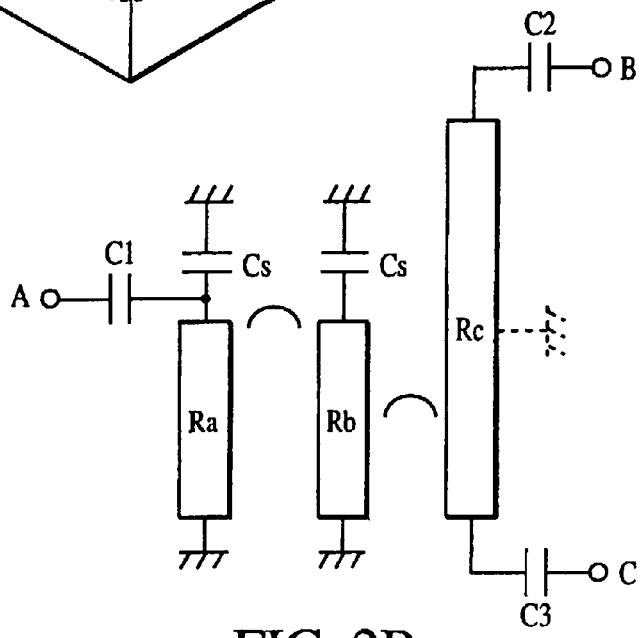
FIG. 2B

FIG. 3A
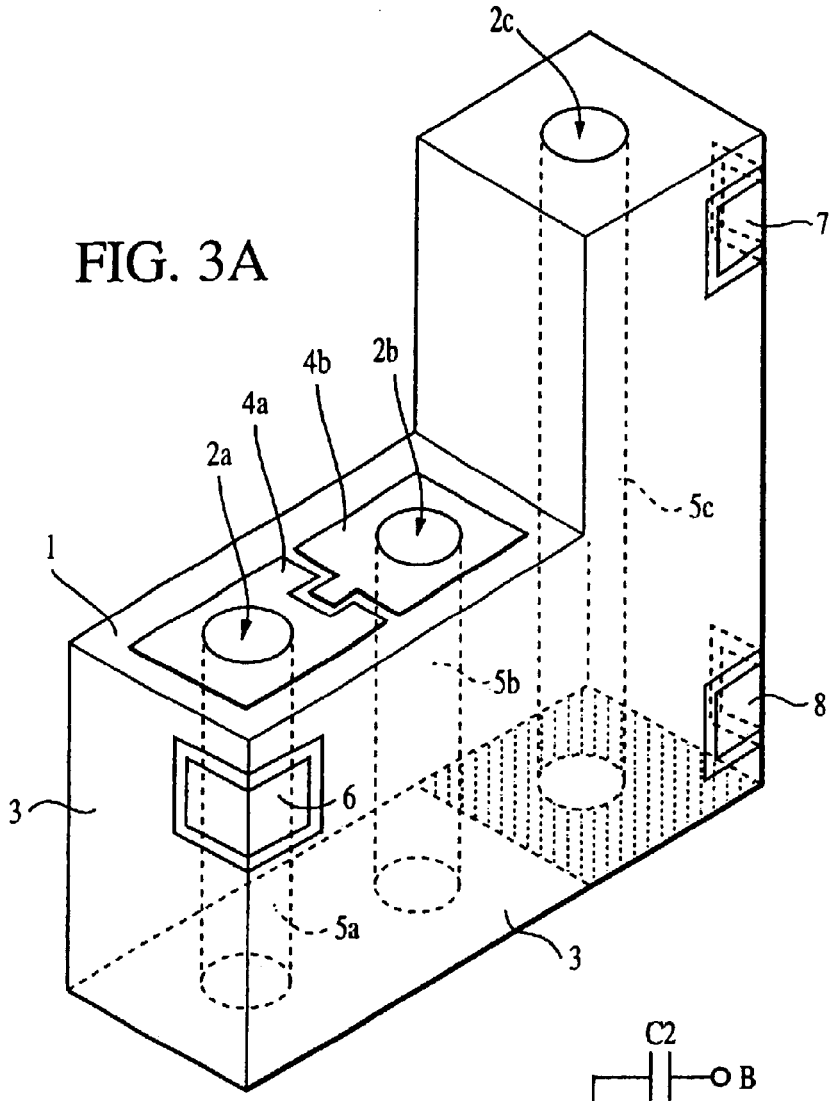
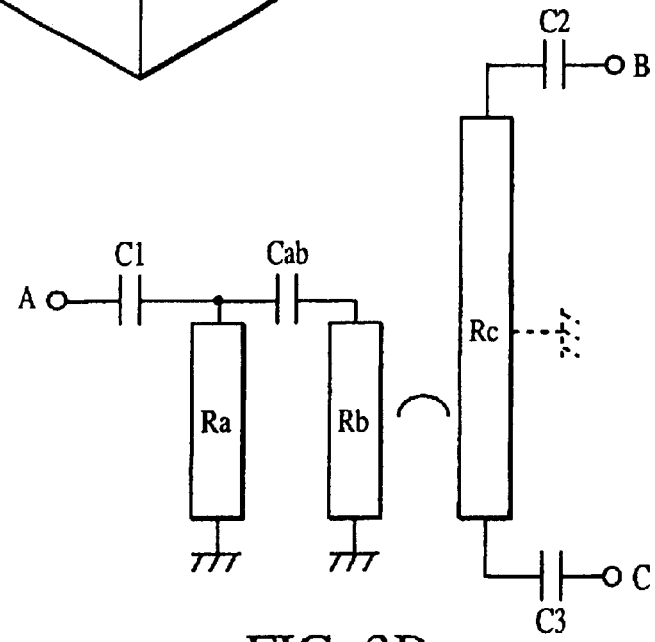
FIG. 3B

FIG. 4A
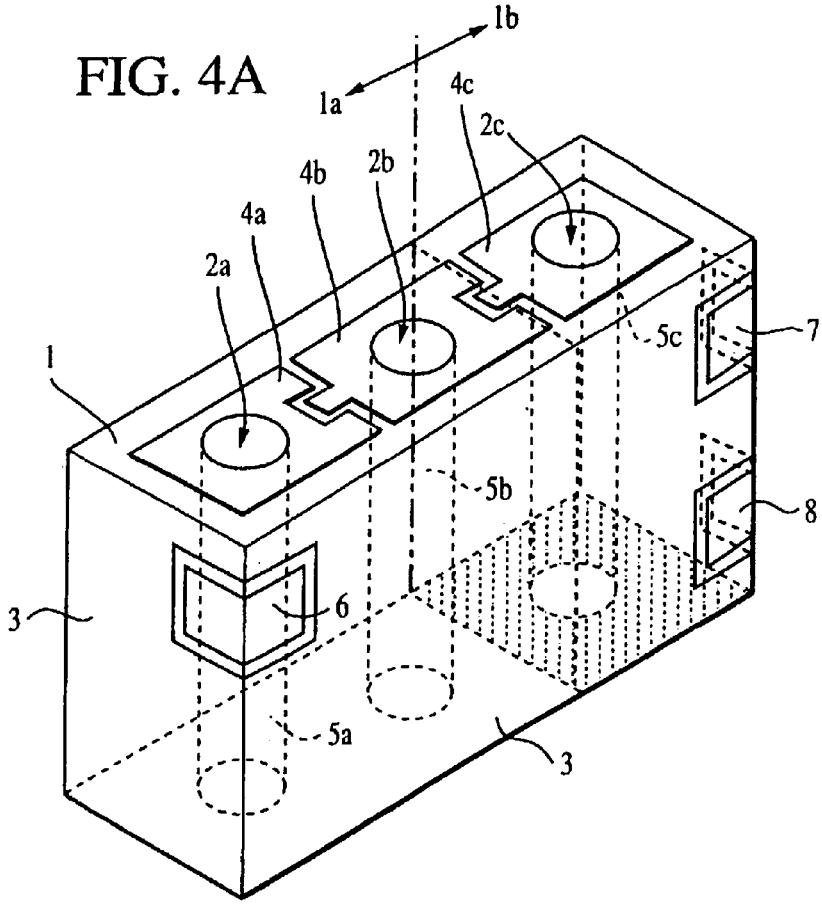
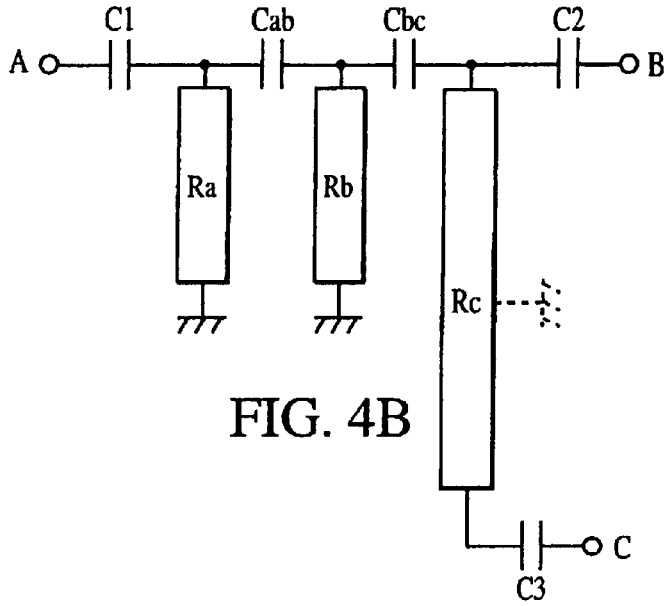
FIG. 4B

FIG. 5A
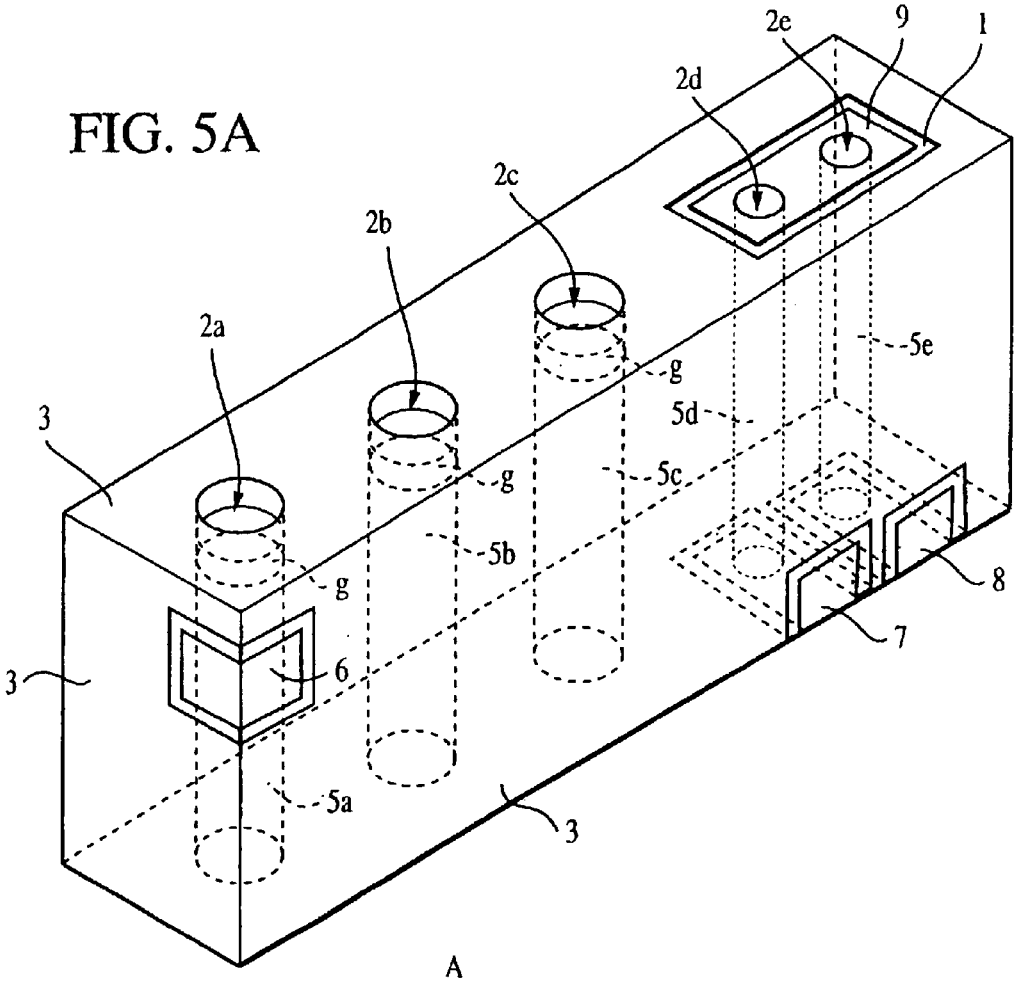
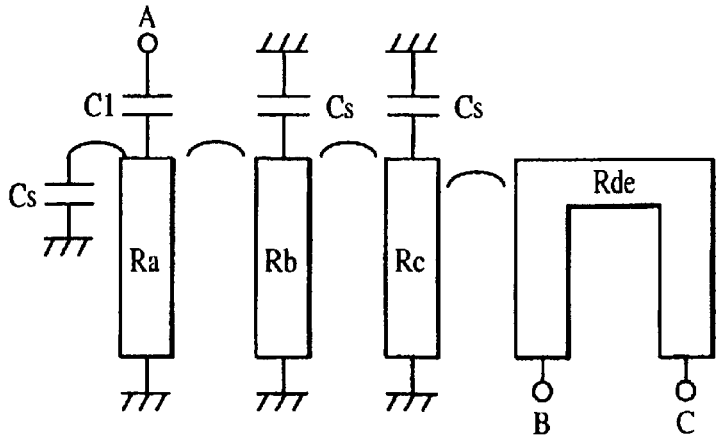
FIG. 5B

FIG. 6A
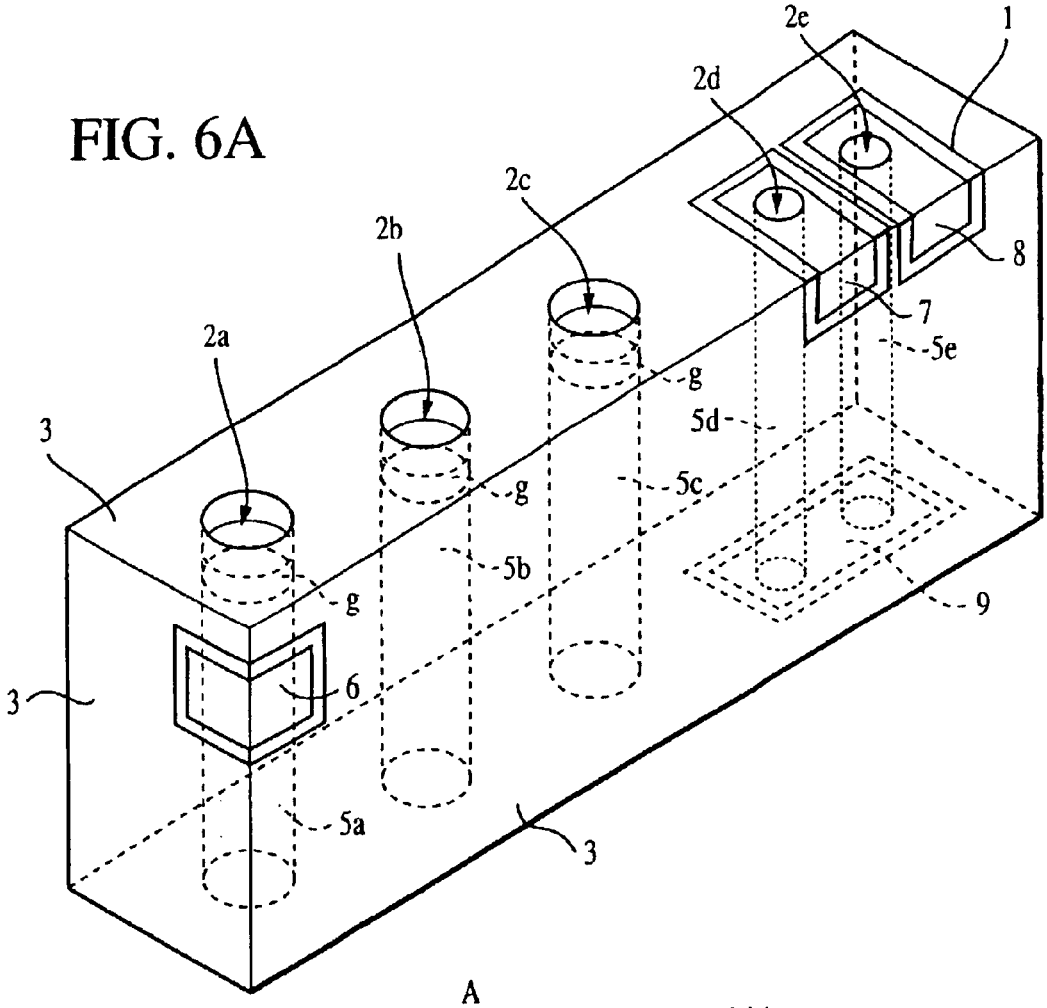
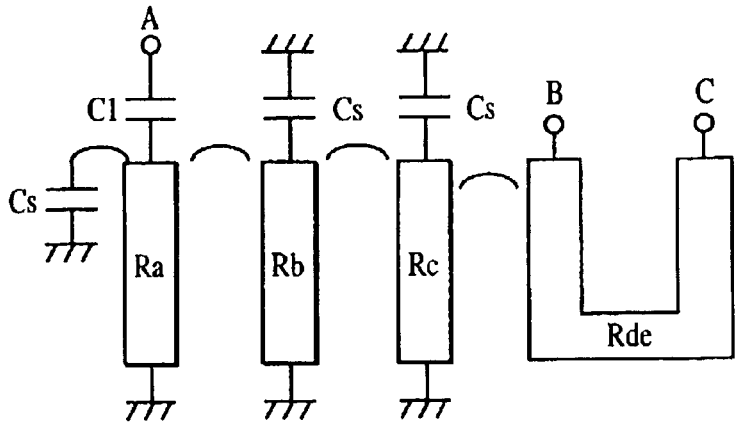
FIG. 6B

FIG. 7A
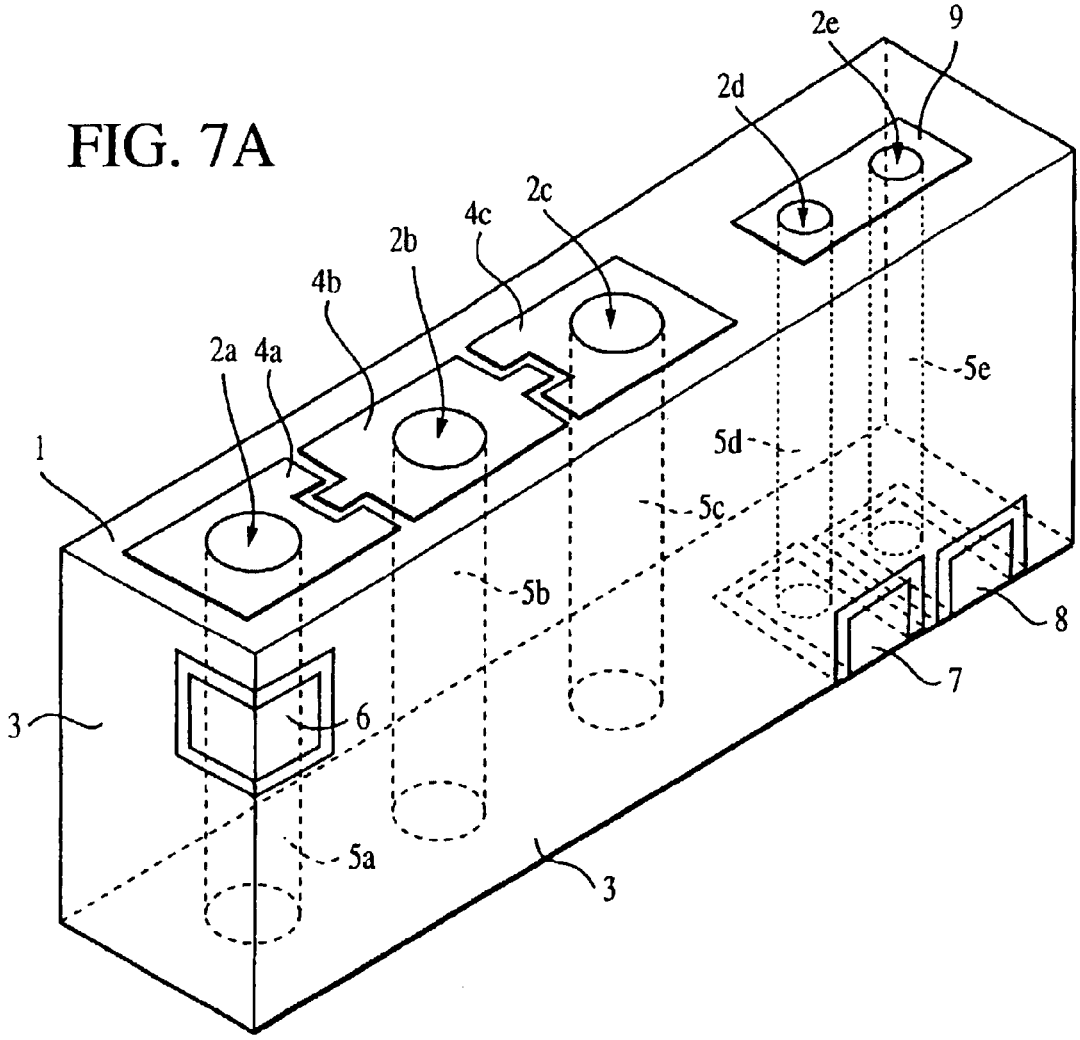
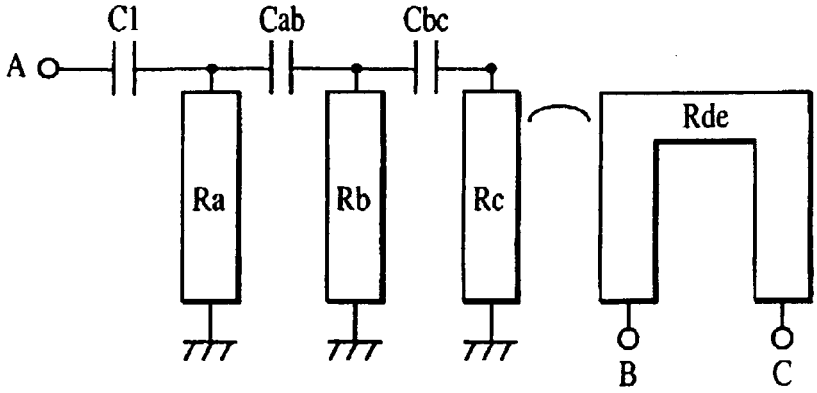
FIG. 7B

DIELECTRIC FILTER, DIELECTRIC DUPLEXER, AND COMMUNICATION APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a dielectric filter for use in a high frequency band, a dielectric duplexer, and a communication apparatus using the dielectric filter or the dielectric duplexer.

2. Description of the Related Art

FIGS. 10A, 10B, and 10C show the configuration of a dielectric filter using a dielectric block, mainly for use in a microwave band. FIG. 10B is a front view showing the dielectric filter which is made to stand. FIG. 10A is a plan view thereof. FIG. 10C is a bottom view thereof. FIG. 10D is a left side view thereof. FIG. 10E is a right side view. In FIG. 10, a dielectric block 1 has inner conductor formed holes 2a, 2b, and 2c formed inside thereof, and inner conductors 5a, 5b, and 5c are formed on the inner walls of the holes 2a, 2b, and 2c. On the outer surface of the dielectric block 1, an outer conductor 3 is formed, and terminal electrodes 6 and 7 are provided in predetermined positions so as to be insulated from the outer conductor 3. The terminal electrode 6 is capacitively coupled to the inner conductors 5a, and the terminal electrode 7 to the inner conductor 5c. Like this, a dielectric filter composed of three-stage resonators and having a band-pass characteristic is formed.

However, in the dielectric filter as shown in FIGS. 10A to 10E, the terminal electrodes 6 and 7 input or output signals unbalanced with respect to the earth potential (the potential of the outer conductor) as a reference potential. Accordingly, in order to give signals to an amplifier circuit of a balanced input type, for example, it is needed that unbalanced signals are converted to balanced signals by means of a balun (unbalanced-to-balanced transformer). As a result, the area on a circuit substrate, occupied by a filter circuit part, is increased. This is one of the causes which make it difficult to downsize the dielectric filter.

SUMMARY OF THE INVENTION

To overcome the above described problems, preferred embodiments of the present invention provide a dielectric filter which can input or output balanced signals, not using a balun, a dielectric duplexer, and a communication apparatus using the dielectric filter or the dielectric duplexer.

One preferred embodiment of the present invention provides A dielectric filter, comprising: a single dielectric member; a conductor film disposed on the single dielectric member; a λ/2 resonator provided in association with the single dielectric member, having both-ends open or short-circuited, and resonating substantially at a half wavelength of a predetermined frequency; a λ/4 resonator provided in association with the single dielectric member, having one short-circuited end and the other open end, and resonating substantially at a quarter wavelength of the predetermined frequency; a first terminal connected to the λ/4 resonator and functioning as an unbalanced terminal; and second terminals respectively connected to the two open ends of the λ/2 resonator and functioning as balanced terminals.

According to the above described structure and arrangement, the transmission mode can be converted by use of the unbalanced terminal and the balanced terminals, and moreover, signals in a predetermined frequency band range can be transmitted or attenuated.

In the above described dielectric filter, the dielectric constant of the portion of the dielectric member where the λ/2 resonator is located may be higher than that of the dielectric member where the λ/4 resonator is located so that the resonator lengths of the λ/2 resonator and the λ/4 resonator are substantially equal to each other.

According to the above described structure and arrangement, when the λ/2 resonator and the λ/4 resonator are formed by use of a dielectric block for example, no step is formed on the dielectric block. Therefore, no cracks are formed and also, the dielectric block can be easily clipped. This facilitates the production, and moreover, the handling of components when assembled in an electronic apparatus.

In the above described dielectric filter, the λ/2 resonator may be shaped so as to be doubled back substantially from the center thereof.

According to the above described structure and arrangement, even when the λ/2 resonator and the λ/4 resonator to be coupled to the λ/2 resonator are formed on a single dielectric member with a uniform dielectric constant, the axial lengths of both of the resonators can be set to be equal to each other.

In the above described dielectric filter, at least one of the λ/2 resonator and the λ/4 resonator may comprise a microstrip line or a strip line.

According to the above described structure and arrangement, a circuit provided with a filter, together with a circuit for inputting-outputting balanced signals and a circuit for inputting-outputting unbalanced signals, can be conveniently formed with no balun being provided.

In the above described dielectric filter, at least one of the λ/2 resonator and the λ/4 resonator may comprise a dielectric coaxial resonator made up of a dielectric block having a conductor film disposed thereon.

According to the above described structure and arrangement, the circuit provided with the filter, together with the circuit for inputting-outputting balanced signals and the circuit for inputting-outputting unbalanced signals, can be simply formed with no balun being provided, merely by mounting the dielectric filter on a circuit substrate, though the dielectric filter comprises a coaxial resonator.

Another preferred embodiment of the present invention provides a dielectric duplexer which includes a transmission filter and a reception filter each having the above-described configuration of the dielectric filter.

According to the above described structure and arrangement, the transmission mode can be converted and moreover, a transmission signal can be output, or a reception signal can be input by use of the unbalanced terminal and the balanced terminals.

Yet another preferred embodiment of the present invention provides a communication apparatus including the above described dielectric filter or the above described dielectric duplexer.

According to the above described structure and arrangement, a communication apparatus downsized and light in weight can be formed.

Other features and advantages of the present invention will become apparent from the following description of the invention which refers to the accompanying drawings.

BRIEF DESCRIPTION OF THE DRAWINGS

FIGS. 2A and 2B are an appearance perspective view and an equivalent circuit diagram of a dielectric filter according to a second embodiment of the present invention;

FIGS. 3A and 3B are an appearance perspective view and an equivalent circuit diagram of a dielectric filter according to a third embodiment of the present invention;

FIGS. 4A and 4B are an appearance perspective view and an equivalent circuit diagram of a dielectric filter according to a fourth embodiment of the present invention;

FIGS. 5A and 5B are an appearance perspective view and an equivalent circuit diagram of a dielectric filter according to a fifth embodiment of the present invention;

FIGS. 6A and 6B are an appearance perspective view and an equivalent circuit diagram of a dielectric filter according to a sixth embodiment of the present invention;

FIGS. 7A and 7B are an appearance perspective view and an equivalent circuit diagram of a dielectric filter according to a seventh embodiment of the present invention;

DESCRIPTION OF THE PREFERRED EMBODIMENTS

The configuration of a dielectric filter according to a first embodiment of the present invention will be described with reference to FIG. 1.

Figure 1A:
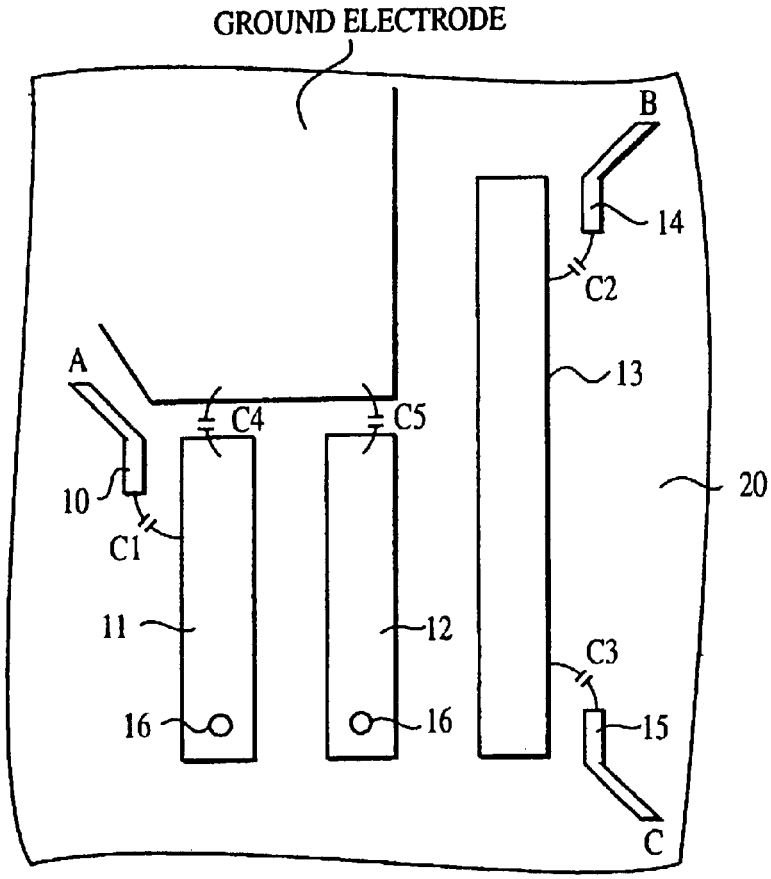
FIGS. 1A and 1B are a plan view and an equivalent circuit diagram of a dielectric filter according to a first embodiment of the present invention.

FIG. 1A is a plan view of the dielectric filter. Strip line electrodes 11, 12, and 13 are arranged adjacently to each other on the upper side of a dielectric substrate 20. An earth electrode is formed on substantially the whole of the underside of the dielectric substrate 20. The dielectric substrate 20, the strip line electrodes 11, 12, and 13, and the earth electrode constitute microstrip line resonators, respectively. Through-holes 16 electrically connect one ends of the strip line electrodes 11 and 12 to the earth electrode on the underside of the substrate, respectively. Strip line electrodes 10, 14, and 15 are provided as terminals, respectively. A capacitance C1 is generated between the strip line electrode 10 and the vicinity on the other end of the strip line electrodes 11, and capacitances C2 and C3 between the strip line electrodes 14 and 15 and the vicinities of both ends of the strip line electrode 13, respectively. Further, stray capacitances C4 and C5 are generated between the open ends of the strip line electrodes 11 and 12 and the earth electrode, respectively.

The strip line electrodes 11 and 12 function as a λ/4 resonator of which one end is short-circuited and the other end is open, respectively. Further, the strip line electrode 13 acts as a λ/2 resonator of which both ends are open. Accordingly, since the center of the strip line electrode 13 is equivalently short-circuited (zero potential) and moreover, the line-length of the strip line electrode 13 is nearly two times that of each of the strip line electrodes 11 and 12, the resonance frequency of the above-mentioned λ/4 resonator is substantially equal to that of each λ/2 resonator.

Figure 1B:
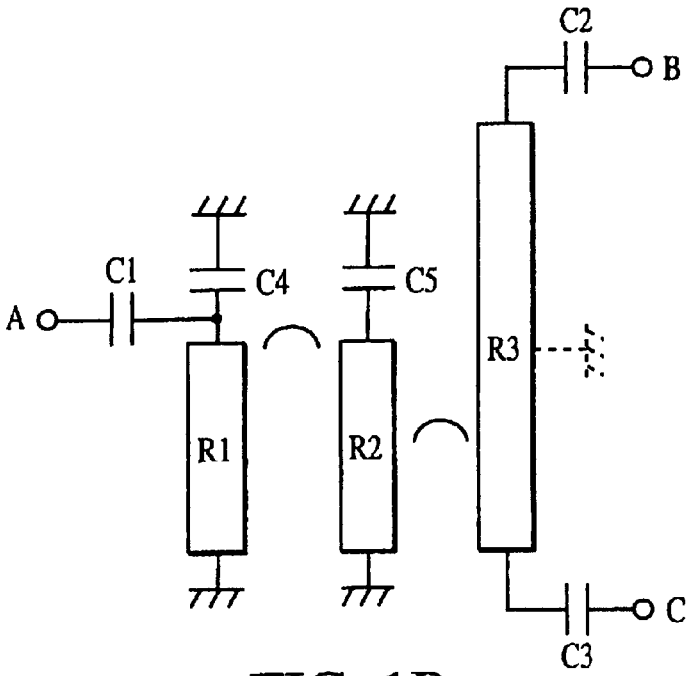

FIG. 1B is an equivalent circuit diagram of the dielectric filter of FIG. 1A. In FIG. 1B, R1 and R2 designate the above-described λ/4 resonators, and R3 the above-described λ/2 resonator, respectively. Here, the resonators R1 and R2 are comb-line coupled to each other, while the resonators R2 and R3 are interdigitally coupled. Accordingly, when a signal is input through a terminal A, the resonator R3 is excited via the resonators R1 and R2. Since the potentials at both ends of the resonator R3 have the relation that the phase difference is 180°, balanced outputs with a phase difference of 180° can be obtained through the output terminals B and C of the resonator R3. Thus, the terminal A can be employed as an unbalanced input terminal, and the terminals B and C as balanced output terminals. Further, band-pass filter characteristics are provided between the input and the outputs of the dielectric filter, due to the three-stage resonators.

To the contrary, unbalanced signals can be output through the terminal A by inputting balanced signals to the terminals B and C.

In the embodiment of FIG. 1, the above-mentioned stray capacitances are produced, and the resonators R1 and R2 are comb-line coupled (inductively coupled) to each other. In addition, the resonators R1 and R2 may be capacitively coupled by increasing the width between the open ends of the strip line electrodes 11 and 12. Further, the above-described resonators may be coupled to each other by use of a lumped-constant element such as a capacitor, as well as by the comb-line coupling and the interdigital coupling.

Moreover, in the embodiment of FIG. 1, the ends of the strip line electrodes 11 and 12 are electrically connected via the through-holes to the earth electrode on the underside of the substrate. The ends of the strip line electrodes 11 and 12 may be connected to the earth electrode present on the same surface as the strip line electrodes 11 and 12.

Next, the configuration of a dielectric filter according to a second embodiment of the present invention will be described with reference to FIGS. 2A and 2B.

FIG. 2A is an appearance perspective view of the dielectric filter. When the dielectric filter is surface-mounted onto a circuit substrate, the face of the dielectric filter shown on the lower right side of FIG. 2A is opposed to the circuit substrate.

In FIG. 2A, a dielectric block 1 is provided with three inner conductor formed holes 2a, 2b, and 2c. An outer conductor 3 is formed on the outer surface of the dielectric block 1 excluding the vicinities of the both open-ends of the inner conductor formed hole 2c. Inner conductors 5a, 5b, and 5c are formed on the inner walls of the inner conductor formed holes 2a, 2b, and 2c, respectively. Inner conductor non-formation portions g are formed in the inner conductor formed holes 2a and 2b, near the openings on one side thereof, respectively. With this configuration, each of the inner conductors 5a and 5b has a stray capacitance between one end thereof and the earth, is short-circuited at the other end thereof, and resonates at a λ/4 resonator which resonates at a quarter wavelength. Further, the inner conductor 5c is open at both ends thereof, and acts as a λ/2 resonator which resonates at a half wavelength. On the outer surface of the dielectric block 1, formed are terminal electrodes 6, 7, and 8 which are separated from the outer conductor 3, respectively. A capacitance is produced between the terminal electrode 6 and the open end near to the inner conductor non-formation portion g of the inner conductor 5a. Further, capacitances are generated between the terminal electrodes 7 and 8 and both open-ends of the inner conductor 5c, respectively.

FIG. 2B is an equivalent circuit diagram of the dielectric filter of FIG. 2A. Here, terminals A, B, and C correspond to the terminal electrodes 6, 7, and 8, respectively. A capacitance C1 is produced between the vicinity of the open end of the inner conductor 5a and the terminal electrode 6, and capacitances C2 and C3 between the vicinities of both open-ends of the inner conductor 5c and the terminal electrodes 7 and 8, respectively. A capacitance Cs is produced in each inner conductor non-formation portion g. Ra and Rb designate the above-mentioned λ/4 resonators, and Rc the λ/2 resonator. Here, the resonators Ra and Rb are comb-line coupled to each other, while the resonators Rb and Rc are interdigitally coupled. Accordingly, when a signal is input through the terminal A, the resonator Rc is excited via the resonators Ra and Rb. Since the potentials at both ends of the resonator Rc has the relation that the phase difference is 180°, balanced outputs with a phase difference of 180° are output from the output terminals B and C, respectively. Thus, the terminal A can be used as an unbalanced input terminal, and the terminals B and C as balanced output terminals. Accordingly, band-pass filter characteristics are provided between the input and the outputs of the dielectric filter, due to the resonators Ra, Rb, and Rc. To the contrary, an unbalanced signal can be output through the terminal A by inputting balanced signals through the terminals B and C.

FIGS. 3A and 3B are an appearance perspective view and an equivalent circuit diagram of a dielectric filter according to a third embodiment of the present invention.

In this embodiment, as shown in FIG. 3A, three inner conductor formed holes 2a, 2b, and 2c are formed in a dielectric block 1. Inner conductors 5a, 5b, and 5c are formed on the inner walls of the inner conductor formed holes 2a, 2b, and 2c, respectively. An outer conductor 3 is formed on the outer surface of the dielectric block 1 excluding the opening faces on the upper side, viewed in FIG. 3A, of the inner conductor formed holes 2a and 2b, and the opening faces on the upper side and the underside, viewed in FIG. 3A, of the inner conductor formed hole 2C. Coupling electrodes 4a and 4b are formed on the opening faces on the upper sides, viewed in FIG. 3A, of the inner conductor formed holes 2a and 2b so as to be connected to the inner conductors 5a and 5b, respectively. Terminal electrodes 6, 7, and 8 are formed on the outer surface of the dielectric block 1 so as to be separated from the outer conductor 3.

In FIG. 3B, terminals A, B, and C correspond to the terminal electrodes 6, 7, and 8, respectively. A capacitance C1 is produced between the vicinity of the open end of the inner conductor 5a and the terminal electrode 6. A capacitance Cab is generated between the coupling electrodes 4a and 4b. Capacitance C2 and C3 are produced between the vicinities of both open-ends of the inner conductor 5c and the terminal electrodes 7 and 8, respectively. Resonators Ra, Rb, and Rc include the above-described inner conductors 5a, 5b, and 5c, respectively. The resonators Ra and Rb function as λ/4 resonators, and are capacitively coupled through the capacitance Cab. Equivalently, the center of the resonator Rc is a short-circuited end. Accordingly, with the arrangement shown in FIG. 3B, the resonator Rb and the resonator Rc are interdigitally coupled. Further, since the line length of the resonator Rc is equal to a half wavelength, signals are input or output at a phase difference of 180° through the terminals B and C. Thus, the terminal A can be employed as an unbalanced input-output terminal, and the terminals B and C as balanced input-output terminals. Band-pass filter characteristics are provided between the input-output and the outputs-inputs, due to the three-stage resonators.

FIGS. 4A and 4B are an appearance perspective view and an equivalent circuit diagram of a dielectric filter according to a fourth embodiment of the present invention, respectively.

In this embodiment, as seen in FIG. 4A, three inner conductor formed holes 2a, 2b, and 2c are formed in a dielectric block 1. Inner conductors 5a, 5b, and 5c are formed on the inner walls of the inner conductor formed holes 2a, 2b, and 2c, respectively. An outer conductor 3 is formed on the outer surface of the dielectric block 1, excluding the opening faces on the upper side, viewed in FIG. 4A, of the inner conductor formed holes 2a and 2b and the opening faces on the upper side and the underside, viewed in FIG. 4A, of the inner conductor formed hole 2C. Coupling electrodes 4a, 4b, and 4c are formed on the opening faces on the upper sides, viewed in FIG. 4A, of the inner conductor formed holes 2a, 2b, and 2c so as to be connected to the inner conductors 5a, 5b, and 5c, respectively. Further, on the outer surface of the dielectric block 1, terminal electrodes 6, 7, and 8 are formed on the outer surface of the dielectric block 1 so as to be separated from the outer conductor 3.

The dielectric constant of the portion 1b of the dielectric block 1 is set to be about four times that of the portion 1a. This structure of the dielectric block 1 can be produced by integrally molding two types of dielectric blocks with different dielectric constants or bonding two dielectric blocks molded individually, to each other.

With the above-described configuration, the resonators including the inner conductors 5a and 5b function as λ/4 resonators, respectively, while the resonator including the inner conductor 5c act as a λ/2 resonator. When the inner conductors are applied as resonant lines, the wavelengths on the resonant lines of each λ/4 resonators and the λ/2 resonator have a relation of 2 to 1. Therefore, the λ/4 resonators and the λ/2 resonator resonate substantially at the same resonance frequency.

With the above-described configuration, the dielectric filter can be formed by use of a substantially parallelepiped dielectric block, and therefore, the structure of a metallic mold for the dielectric block can be simplified, and cracks of the dielectric block, which will occur at molding, are inhibited. In addition, the dielectric block can be easily conveyed and clipped during production of a dielectric filter.

In FIG. 4B, terminals A, B, and C correspond to the terminal electrodes 6, 7, and 8, respectively. A capacitance C1 is produced between the vicinity of the open end of the inner conductor 5a and the terminal electrode 6, a capacitance Cab between the coupling electrodes 4a and 4b, and a capacitance Cbc between the coupling electrodes 4b and 4c. Further, capacitances C2 and C3 are generated between the vicinities of both ends of the inner conductor 5c and the terminal electrodes 7 and 8, respectively. Resonators Ra, Rb, and Rc are composed of the inner conductors 5a, 5b, and 5c, respectively. The resonators Ra and Rb are capacitively coupled through the capacitance Cab. The resonators Rb and Rc are capacitively coupled through the capacitance Cbc. Since the line length of the resonator Rc is equal to a half wavelength, signals are input or output at a phase difference of 180° through the terminals B and C. Accordingly, the terminal A can be employed as an unbalanced input-output terminal, and the terminals B and C as balanced input-output terminals. Thus, band-pass filter characteristics are provided between the input-output and the outputs-inputs, due to the three-stage resonators.

FIGS. 5A and 5B are an appearance perspective view and an equivalent circuit diagram of a dielectric filter according to a fifth embodiment of the present invention.

As shown in FIG. 5A, five inner conductor formed holes 2a to 2e are provided for a dielectric block 1. Inner conductors 5a to 5e are formed on the inner walls of the holes 2a to 2e, respectively. Inner conductor non-formation portions g are formed in the inner conductor formed holes 2a to 2c, near to the opening faces on one side thereof. An outer conductor 3 is formed on the six outer faces of the dielectric block 1, and in a part of the outer faces, terminal electrodes 6, 7, and 8 are formed so as to be separated from the outer conductor 3. The terminal electrodes 7 and 8 are connected to the ends on one sides of the inner conductors 5d and 5e, respectively. Further, on the other end portions of the inner conductors 5d and 5e, a relay electrode 9 is formed so as to relay the inner conductors 5d and 5e.

In FIG. 5B, terminals A, B, and C correspond to the terminal electrodes 6, 7, and 8, respectively. A capacitance C1 is produced between the vicinity of the open end of the inner conductor 5a and the terminal electrode 6. Capacitances Cs are generated in the inner conductor non-formation portions g. λ/4 resonators Ra, Rb, and Rc include the inner conductors 5a to 5c, respectively. A λ/2 resonator Rde includes the inner conductors 5d and 5e. Here, the resonators Ra to Rc are comb-line coupled, and the resonators Rc and Rde are inductively coupled (interdigitally coupled). The potentials at both ends of the resonator Rc have the relation that the phase difference is 180°. Thus, the terminal A can be employed as an unbalanced input-output terminal, and the terminals B and C as the balanced input-output terminals.

FIGS. 6A and 6B are an appearance perspective view and an equivalent circuit diagram of a dielectric filter according to a sixth embodiment of the present invention.

As shown in FIG. 6A, five inner conductor formed holes 2a to 2e are provided for a dielectric block 1. Inner conductors 5a to 5e are formed on the inner walls of the holes 2a to 2e, respectively. Terminal electrodes 7 and 8 are further extended from the upper side of the dielectric block 1, viewed in FIG. 6A and a relay electrode 9 is formed on the underside of the dielectric block 1, differently from the embodiment of FIG. 5. The other configuration is the same as that shown in FIG. 5. Accordingly, the resonators Ra to Rc are comb-line coupled to each other, and the resonators Rc and Rd are capacitively coupled (comb-line coupled). Also in this case, the potentials at both ends of the resonator Rc have the relation that the phase difference is 180°. Therefore, the terminal A can be employed as an unbalanced input-output terminal, and the terminals B and C as balanced input-output terminals.

FIGS. 7A and 7B are an appearance perspective view and an equivalent circuit diagram of a dielectric filter according to a seventh embodiment of the present invention.

In this embodiment, as shown in FIG. 7A, five inner conductor formed holes 2a to 2e are provided for a dielectric block 1. Inner conductors 5a to 5e are formed on the inner walls of the inner conductor formed holes 2a to 2e, respectively. The opening face on the upper side, viewed in FIG. 7, of the dielectric block 1 is an open face of the dielectric block 1, and an outer conductor 3 is formed the other five faces. Coupling electrodes 4a, 4b, and 4c are formed on the opening faces on the upper side, viewed in FIG. 7A, of the inner conductor formed holes 2a, 2b, and 2c so as to be connected to the inner conductors 5a, 5b, and 5c, respectively. Terminal electrodes 6, 7, and 8 are formed on the outer surface of the dielectric block 1 so as to be separated from the outer conductor 3. The terminal electrodes 7 and 8 are connected to one ends of the inner conductors 5d and 5e, respectively. Further, a relay electrode 9 is formed on the other ends of the inner conductors 5d and 5e, respectively, so as to relay the conductors 5d and 5e.

In FIG. 7B, terminals A, B, and C correspond to the terminal electrodes 6, 7, and 8. A capacitance C1 is produced between the vicinity of the open end of the inner conductor 5a and the terminal electrode 6, a capacitance Cab between the coupling electrode 4a and 4b, and a capacitance Cbc between the coupling electrodes 4b and 4c. λ/4 resonators Ra, Rb, and Rc include the inner conductors 5a, 5b, and 5c, respectively. The resonators Ra and Rb are capacitively coupled through the capacitance Cab. The resonators Rb and Rc are capacitively coupled through the capacitance Cbc. A λ/2 resonator Rde includes the inner conductors 5d and 5e. The resonators Rc and Rde are interdigitally connected to each other. The potentials at both ends of the resonator Rc have the relation that the phase difference is 180°. Accordingly, the terminal A can be employed as an unbalanced input-output terminal, and the terminals B and C as balanced input-output terminals.

Figure 8:
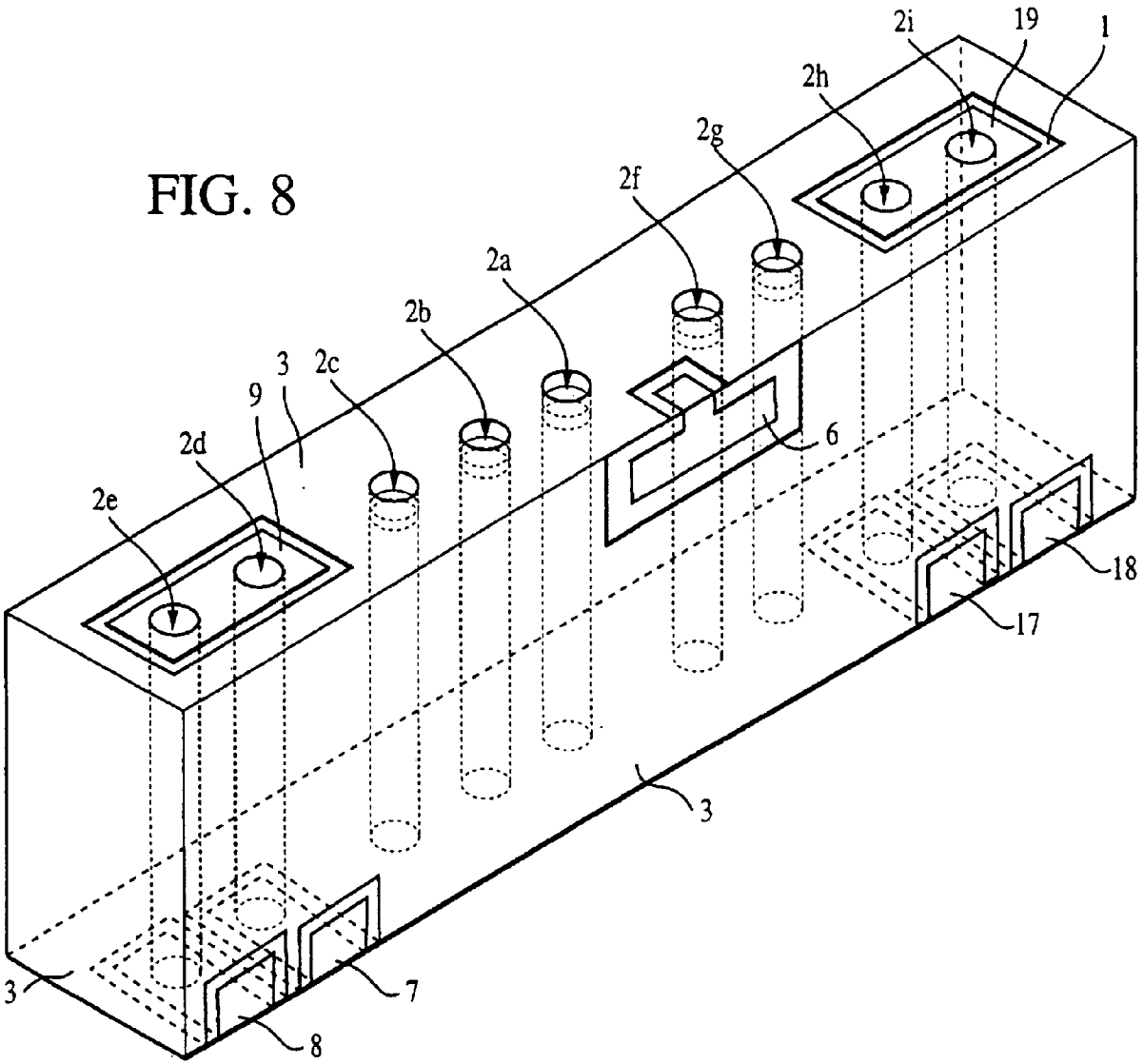
FIG. 8 is a perspective view of a dielectric filter according to an eighth embodiment of the present invention.

FIG. 8 is an appearance perspective view of a dielectric duplexer according to an eighth embodiment of the present invention. Here, terminal electrodes 17 and 18 are provided so as to be connected to one ends of inner conductors on the inner walls of inner conductor formed holes 2h and 2i, respectively. A relay electrode 19 relays the other ends of the inner conductor formed holes 2h and 2i to each other. Capacitances are produced between a terminal electrode 6 and the vicinities of the opening ends of the inner conductors on the inner walls of the inner conductor formed holes 2a and 2f. This dielectric duplexer is equivalent to two sets of the dielectric filters each having the configuration shown in FIG. 5A, formed on a single dielectric block and sharing one terminal electrode. In particular, the part including the inner conductor formed holes 2a to 2e constitutes the dielectric filter shown in FIG. 5A, and the part including the inner conductor formed holes 2f to 2i constitutes the other dielectric filter which is composed on two λ/4 resonators and one λ/2 resonator.

With this configuration, in the dielectric duplexer, the terminal electrodes 7 and 8 function as reception signal output ports, the terminal electrodes 17 and 18 as transmission signal ports, and the terminal electrode 6 as an antenna port, for example.

The dielectric filters and the dielectric duplexer of the second to eighth embodiments, are produced by forming the coaxial resonators by use of the single dielectric block, respectively. However, the dielectric filters and the dielectric duplexer each may be formed of the coaxial resonators obtained by forming inner conductors on the previously-formed grooves of dielectric base plates, and bonding them to each other.

Next, the configuration of a communication apparatus including the dielectric filter or the dielectric duplexer will be described with reference to FIG. 9.

Figure 9:
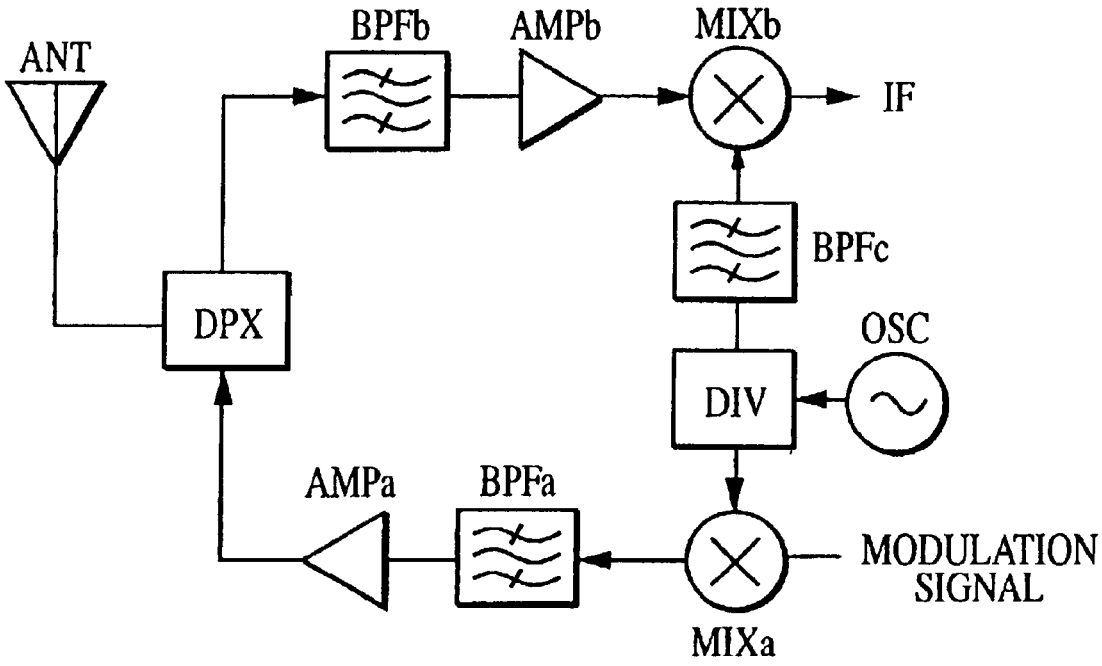
FIG. 9 is a block diagram showing the configuration of a communication apparatus according to a ninth embodiment of the present invention.
Figure 10A:
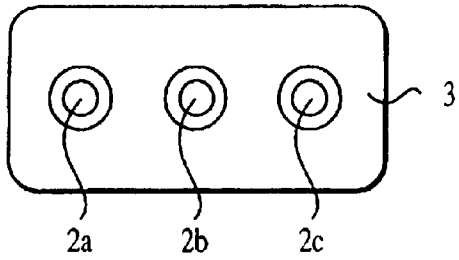
FIG. 10A PRIOR ART
FIGS. 10A, 10B, 10C, 10D and 10E are respectively a plan view, a front view, a bottom view, a left side view and a right side view of a conventional dielectric filter.
Figure 10D:
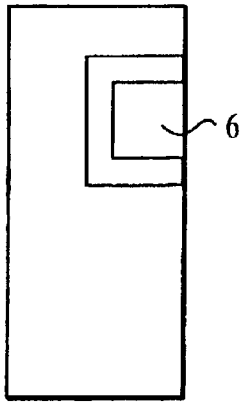
FIG. 10D PRIOR ART
Figure 10B:
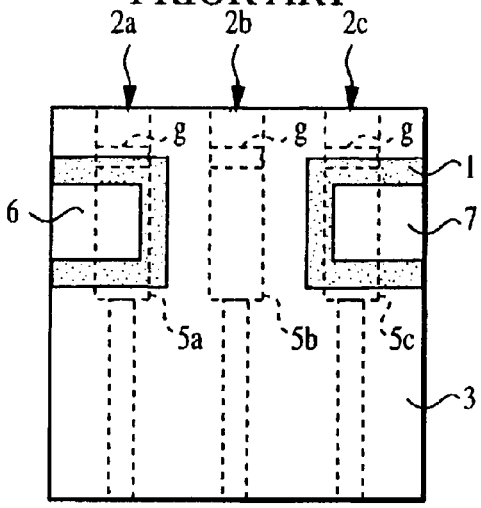
FIG. 10B PRIOR ART
Figure 10E:
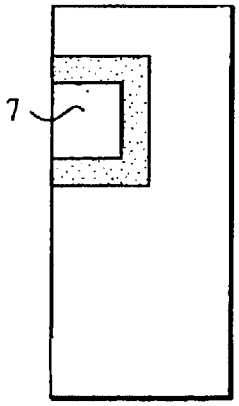
FIG. 10E PRIOR ART
Figure 10C:
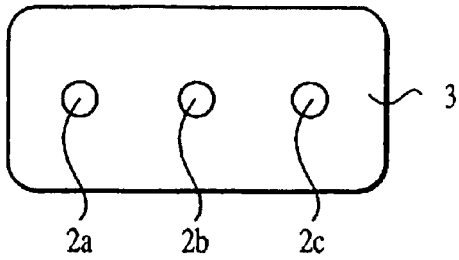
FIG. 10C PRIOR ART

FIG. 9 shows a transmission-reception antenna ANT, a duplexer DPX, band-pass filters BPFa, BPFb, and BPFc, amplifier circuits AMPa and AMPb, mixers MIXa and MIXb, an oscillator OSC, and a frequency divider (synthesizer) DIV. The mixer MIXa modulates a frequency signal output from the frequency divider DIV by use of a modulation signal, and the band-pass filter BPFa transmits only signals in a transmission frequency band range. The amplifier circuit AMPa power-amplifies the signals to transmit through the antenna ANT via the duplexer DPX. The band-pass filter BPFb transmits only the signals in a reception frequency band range of signals output from the duplexer DPX. The amplifier circuit AMPb amplifies the signals. The mixer MIXb mixes a frequency signal output from the band-pass filter BPFc with a reception signal to output an intermediate frequency signal IF.

In the case where the amplifier circuits AMPa and AMPb are balanced input-output circuits, a duplexer having the configuration shown in FIG. 8 can be employed for the duplexer DPX part. Moreover, a dielectric filter having the configuration shown in any of FIGS. 1 to 7 can be employed for the band-pass filters BPFa and BPFb. Like this, the balance-unbalance conversion can be performed, simultaneously with the filtering, though no exclusive-use balun is provided. Accordingly, a communication apparatus downsized as a whole can be formed.

While the invention has been particularly shown and described with reference to preferred embodiments thereof, it will be understood by those skilled in the art that the forgoing and other changes in form and details may be made therein without departing from the spirit of the invention.

What is claimed is:

1. A dielectric filter, comprising:

a single dielectric member;

a conductor film disposed on the single dielectric member;

[a] *an ungrounded* λ/2 resonator comprising a strip electrode provided in association with the single dielectric member, resonating substantially at a half wavelength of a predetermined frequency;

a λ/4 resonator comprising a strip electrode provided in association with the single dielectric member, resonating substantially at a quarter wavelength of the predetermined frequency;

a first terminal comprising a respective strip electrode capacitively connected to the λ/4 resonator and functioning as an unbalanced terminal; and second terminals respectively comprising strip electrodes capacitively connected to the λ/2 resonator and functioning as balanced terminals.

2. The dielectric filter according to claim 1, wherein said λ/4 resonator has a short-circuited end and an open end, said open end being coupled by a stray capacitance to said conductor film and said short-circuited end being grounded directly to said conductor film.

3. A communication apparatus including the dielectric filter of claim 1.

4. The dielectric filter according to claim 1, wherein at least one of the λ/2 resonator and the λ/4 resonator comprises a micro-strip line or a strip line.

5. A dielectric duplexer including the dielectric filter of claim 1.

6. A communication apparatus including the dielectric duplexer of claim 5.

7. A dielectric filter, comprising:

a single dielectric member;

a conductor film disposed on the single dielectric member;

[a] *an ungrounded* λ/2 resonator comprising a respective strip electrode provided in association with the single dielectric member, resonating substantially at a half wavelength of a predetermined frequency;

a first λ/4 resonator comprising a respective strip electrode provided in association with the single dielectric member, and resonating substantially at a quarter wavelength of the predetermined frequency;

a second λ/4 resonator comprising a respective strip electrode provided in association with the single dielectric member, and resonating substantially at a quarter wavelength of the predetermined frequency;

a first terminal comprising a respective strip electrode capacitively connected to the λ/4 resonator and functioning as an unbalanced terminal and second terminals respectively comprising strip electrodes capacitively connected to the λ/2 resonator and functioning as balanced terminals wherein said first and second λ/4 resonators are comb-line coupled to each other, and said second λ/4 resonator and said λ/2 resonator are interdigitally coupled to each other.

8. A dielectric duplexer comprising two filters, one of said filters being the dielectric filter of claim 7.

9. A communication apparatus comprising a communication circuit including at least one of a transmitting circuit and a receiving circuit, and connected thereto, the duplexer of claim 8.

10. A communication apparatus comprising a communication circuit including at least one of a transmitting circuit and a receiving circuit, and connected thereto, the dielectric filter of claim 7.

11. The dielectric filter according to claim 7, wherein each said λ/4 resonator has a short-circuited end and an open end, said open end being coupled by a stray capacitance to said conductor film and said short-circuited end being grounded directly to said conductor film.

* * * * *